United States Patent
Kraly

(10) Patent No.: US 10,057,081 B2
(45) Date of Patent: Aug. 21, 2018

(54) COMMUNICATION NETWORK FOR TRANSMISSION OF MESSAGES

(71) Applicant: ELMOS Semiconductor AG, Dortmund (DE)

(72) Inventor: Rainer Kraly, Dortmund (DE)

(73) Assignee: ELMOS SEMICONDUCTOR AG, Dortmund (DE)

(*) Notice: Subject to any disclaimer, the term of this patent is extended or adjusted under 35 U.S.C. 154(b) by 566 days.

(21) Appl. No.: 14/323,463

(22) Filed: Jul. 3, 2014

(65) Prior Publication Data

US 2015/0010017 A1 Jan. 8, 2015

(30) Foreign Application Priority Data

Jul. 4, 2013 (DE) .................. 10 2013 213 089

(51) Int. Cl.
*H04L 12/40* (2006.01)

(52) U.S. Cl.
CPC .... *H04L 12/4013* (2013.01); *H04L 12/40032* (2013.01); *H04L 2012/40215* (2013.01); *H04L 2012/40273* (2013.01)

(58) Field of Classification Search
CPC .......... H04L 12/4013; H04L 12/40032; H04L 2012/40215; H04L 2012/40273
See application file for complete search history.

(56) References Cited

U.S. PATENT DOCUMENTS 6,038,623 A 3/2000 Schutte
2014/0129748 A1* 5/2014 Muth ................ G06F 13/4072
710/106

(Continued)

FOREIGN PATENT DOCUMENTS

EP 2 521 319 A1 11/2012
EP 2 800 316 A1 11/2014

*Primary Examiner* — Un C. Cho
*Assistant Examiner* — Jeremy Costin
(74) *Attorney, Agent, or Firm* — Renner Otto Boisselle and Sklar

(57) ABSTRACT

The communication network for transmission of messages at different transmission rates comprises a bus line (10) and a plurality of bus participants (14, 16) each of which includes a bus transceiver (22) connected to the bus line (10) and a control unit (18) coupled with said bus transceiver, inter alia, for converting messages received via the bus line (10) and for generating messages to be sent via the bus line (10), wherein each message includes control data and payload. The messages include first messages whose payload is transmitted via the bus line (10) at a first rate and second messages whose payload is transmitted via the bus line (10) at a second rate which is higher than the first rate, wherein the control data of each message contain a coding representing the transmission rate of the payload of the respective message. The bus participants (14, 16) include first bus participants (14) which can exclusively process a first payload and second bus participants (16) which can process both first and second messages, wherein the bus transceiver (22) of each first bus participant, upon detection of the coding indicating the second payload transmission rate when receiving a second message, substitutes the payload of this second message by a substitute payload and transmits this substitute payload at the first rate to the control unit (18).

1 Claim, 3 Drawing Sheets

14- First Controller
16- Second Controller
18- Micro Controller
20- Micro Controller
22- Bus Transceiver
24- Bus Transceiver
26- CAN Compliant Bus Transceiver
28- Converter
30- Transmission Filter

(56) References Cited

U.S. PATENT DOCUMENTS

2015/0095532 A1* 4/2015 Muth .................. G06F 13/4072
 710/105
2016/0080168 A1* 3/2016 Lieder ............... H04L 12/40032
 370/468

* cited by examiner

14- First Controller
16- Second Controller
18- Micro Controller
20- Micro Controller
22- Bus Transceiver
24- Bus Transceiver 14- First Controller
16- Second Controller
18- Micro Controller
20- Micro Controller
22- Bus Transceiver
24- Bus Transceiver
26- CAN Compliant Bus Transceiver
28- Converter 14- First Controller
16- Second Controller
18- Micro Controller
20- Micro Controller
22- Bus Transceiver
24- Bus Transceiver
26- CAN Compliant Bus Transceiver
28- Converter
30- Transmission Filter

COMMUNICATION NETWORK FOR TRANSMISSION OF MESSAGES

RELATED CROSS-REFERENCING

The present invention claims the priorities of German Patent Application DE 10 2013 213 089.9 filed on Jul. 4, 2013, the disclosures of which are incorporated herein by reference.

BACKGROUND OF THE INVENTION

Field of the Invention

The present invention relates to a communication network for transmission of messages at different transmission rates.

Description of the Prior Art

The CAN (Controller Area Network) standard was developed in the early 1980ies, in particular for the serial data exchange between electronic controllers (bus participants) in motor vehicles. Later, the CAN standard was used for industrial microcontroller networks (such as internal bus systems of machine tools, for the integration of distributed instrumentation, control and display functions of a lower automation level in a superordinate computer system or as a connecting bus for sensors, actuators or operating interfaces, for example).

For further improvement and in particular increase of the transmission rate in CAN systems the development of a so-called CAN-FD standard has recently been started, this designation meaning "CAN with flexible data rate". Besides the possibility to send the payload at an increased rate (data rate), another difference between the CAN-FD standard and the CAN standard is the increase of the payload from 8 to 64 bytes.

CAN-FD-compliant bus participants and in particular their bus transceivers will be capable of processing CAN messages besides CAN-FD messages. However, this does not function vice versa which means that the previous CAN participants and in particular their bus transceivers will not be able to understand future CAN-FD messages.

The adaption of electronic components of the bus participants designed for the CAN standard to the CAN-FD standard requires, however, new software besides a change of hardware. This is a complex procedure, which in particular holds true for bus participants which need not necessarily be designed for an increased data transmission rate and extended payload fields.

There is need of bus transceivers or converters which allow the previous architecture of the CAN bus participants to be continued to be used, in particular in "mixed communication networks" comprising CAN bus participants and CAN-FD participants.

SUMMARY OF THE INVENTION

The present invention thus suggests a communication network for transmission of messages, comprising
a bus line, and
a plurality of bus participants each of which includes a bus transceiver connected to the bus line and a control unit coupled with said bus transceiver, inter alia, for converting messages received via the bus line and for generating messages to be sent via the bus line,
wherein each message includes control data and payload,
wherein the messages include first messages whose payload is transmitted via the bus line at a first rate and second messages whose payload is transmitted via the bus line at a second rate which is higher than the first rate,
wherein the control data of each message contain a coding representing the transmission rate of the payload of the respective message,
wherein the bus participants include first bus participants which can exclusively process a first payload and second bus participants which can process both first and second messages, and
wherein the bus transceiver of each first bus participant, upon detection of the coding indicating the second payload transmission rate when receiving a second message, substitutes the payload of this second message by a substitute payload and transmits this substitute payload at the first rate to the control unit.

Both CAN messages and the CAN-FD messages are composed of control data and payload. The control data include information (one bit, for example) which indicates whether a message is a CAN message or a message of the CAN-FD type. In the case of a CAN message the payload (and the control data) are transmitted at a first lower rate, while at least the payload (and possibly at least part of the control data) of a second or CAN-FD message are transmitted at a higher second rate. In the case of the CAN or CAN-FD standard all controllers or bus participants are permanently "listening" and reading messages available on the bus. At the same time, a bus participant decides whether the message just sent is destined or not destined for said participant. When receiving a second message the bus transceiver of the CAN bus participant checks the message with regard to the coding as a CAN or as a CAN-FD message. If a CAN-FD message is detected the bus transceiver according to the invention, when receiving the second message, i.e. the CAN-FD message, starts to substitute the payload of this second message by such payload which equals the payload of a first message, i.e. a CAN message, with regard to the data rate. The same may also hold true for the data format. A bus transceiver cannot end the conveyance or forwarding of a CAN-FD message once it has detected the decoding for a CAN-FD message. In this case the control unit or the microcontroller of the CAN bus transceiver would merely receive an incomplete message and for this reason alone generate an error indication. This must be prevented and therefore, according to the invention, the CAN-FD message is converted and transmitted as a message of the CAN type completed with a substitute payload to the microcontroller of the CAN bus participant. Thus the CAN bus participant or its microcontroller (control unit) need (no longer) reject the received message as an unrecognized CAN message or generate a corresponding error indication.

However, an essential feature of the present invention is the adaption of a CAN-FD message to a CAN message, the detection of a CAN-FD message (referred to above as second message) in a bus transceiver and the substitution of the payload of the CAN-FD message transmitted at a high data rate by a substitute payload with a transmission rate which equals the rate of a CAN message (referred to above as first message). Thus a CAN bus participant (referred to above as first participant) receives CAN-FD messages without rejecting them as faulty messages. Without taking a special measure before the messages are checked within a CAN participant, said participant would generate an error message when receiving a CAN-FD message. According to the invention, this can be realized by substituting at least the payload of a CAN message (and possibly part of the control data of this message) by data whose format and/or data rate equal those of a CAN message. The information originally contained in the CAN-FD message is overwritten by the substitute payload and is thus no longer available, which is no problem since normally it is not required any more.

According to this first suggestion of the present invention it is merely necessary to change the architecture of a controller for a CAN bus with regard to the bus transceiver of this controller; the remaining hardware and in particular the software for the controller may remain unchanged.

Appropriately, the corresponding CAN bus participant essentially reacts neutrally when receiving the CAN-FD message converted into a CAN message according to the invention, i.e. it reacts like a CAN participant receiving a CAN message not destined for said participant, for example. However, other scenarios are also conceivable, wherein in any case it should be ensured that the generation of an error indication solely due to conversion of the data should be prevented.

It may in particular be appropriate that the bus transceiver of each first bus participant, in response to the detection of the coding indicating the second payload transmission rate when further receiving a second message, suppresses the transmission of the payload of said second message to the control unit of the respective first bus participant and sends, as a first message, the substitute payload at the first rate to the control unit for completing the message to be sent to said control unit. The behavior of the control unit may depend on the contents of the substitute payload. For example, the bus participant may react passively or initiate an action. It may be appropriate to change the contents of the substitute payload by a programming access via the CAN bus or CAN-FD bus. Such a change may possibly be carried out by the controller (i.e. the participant) itself.

The essential feature of the present invention has been described above on the basis of a variant where the bus transceiver of a CAN controller or a CAN bus participant must be exchanged. However, it is also conceivable that a converter is connected between a CAN bus participant or controller and the bus or bus line, said converter converting CAN-FD messages in a manner described above with regard to the bus transceiver.

Thus the present invention alternatively suggests a communication network for transmission of messages at different transmission rates, comprising a bus line, and
a plurality of bus participants each of which includes a bus transceiver connected to the bus line and a control unit coupled with said bus transceiver, inter alia, for converting messages received via the bus line and for generating messages to be sent via the bus line,
wherein each message includes control data and payload,
wherein the messages include first messages whose payload is transmitted via the bus line at a first rate and second messages whose payload is transmitted via the bus line at a second rate which is higher than the first rate,
wherein the control data of each message contain a coding representing the transmission rate of the payload of the respective message,
wherein the bus participants include first bus participants which can exclusively process a first payload and second bus participants which can process both first and second messages, and wherein between the bus transceivers of each first bus participant and the bus line a converter each is connected which forwards a first message to the respective first bus participant and which, upon detection of the coding indicating the second payload transmission rate when receiving a second message, substitutes the payload of this second message by a substitute payload and transmits this substitute payload at the first rate to the bus transceiver of the first bus participant.

In this variant of the present invention, too, it may be appropriate that the converter upstream of a first bus participant, in response to the detection of the coding indicating the second payload transmission rate when further receiving a second message, suppresses the transmission of the payload of said second message to the bus transceiver of the respective first bus participant and sends, as a first message, a substitute payload at the first rate to the bus transceiver of the respective bus participant for completing the message to be sent to said bus transceiver.

As describe above in connection with the first alternative of the present invention, it may also be appropriate in the second alternative described above that a CAN participant, in response to the substitute payload sent by the converter and received by the bus transceiver of the CAN bus participant, reacts in the same way as in the case of receiving a CAN message not addressed to this first (CAN) participant. The behavior of the control unit may depend on the contents of the substitute payload.

Finally, the approach according to the invention may be used to send CAN messages and CAN-FD messages within a mixed communication network, wherein the communication network is divided into a first portion in which exclusively CAN messages are sent and a second portion in which both CAN messages and CAN-FD messages are sent but alternatively exclusively CAN-FD messages are sent. Such a communication network thus comprises a first and a second bus line section, wherein to the first bus line section exclusively CAN-compliant first (CAN) bus participants are connected, while the second bus line section has connected thereto CAN-FD-compliant (second) bus participants which can either process exclusively CAN-FD messages or, besides these, also CAN messages.

According to the invention, this further variant of a communication network for transmission of messages at different transmission rates comprises a bus line, and
a plurality of bus participants each of which includes a bus transceiver connected to the bus line and a control unit coupled with said bus transceiver, inter alia, for converting messages received via the bus line and for generating messages to be sent via the bus line,
wherein each message includes control data and payload,
wherein the messages include first messages whose payload is transmitted via the bus line at a first rate and second messages whose payload is transmitted via the bus line at a second rate which is higher than the first rate,
wherein the control data of each message contain a coding representing the transmission rate of the payload of the respective message,
wherein the bus participants include first bus participants which can exclusively process a first payload and second bus participants which can process both first and second messages,
wherein the bus line includes a first and a second bus line section, wherein the first bus participants are connected to the first bus line section and the second bus participants are connected to the second bus line section, wherein first messages are adapted to be transmitted both within the first bus line section and within the second bus line section and second messages are adapted to be transmitted exclusively within the second bus line section, and wherein the two bus line sections are coupled with each other via a unidirectional transmission filter for allowing for a transmission of first messages from the first bus line section to the second bus line section and for preventing the transmission of second messages from the second bus line section to the first bus line section.

In this variant of the present invention the approach according to the invention is realized by a unidirectional transmission filter which allows for forwarding of CAN messages to the second bus line section but prevents CAN-FD messages from the second bus line section from being transmitted to the first bus line section or converts such messages into CAN messages in a manner as described above and then forwards them to the first bus line section.

The further development described above of the two first variants of the present invention hold correspondingly true for the third variant according to the invention of the CAN-FD communication network which comprises an area whose bus participants are merely CAN-compliant.

BRIEF DESCRIPTION OF THE DRAWINGS

Hereinafter the present invention is described in detail on the basis of three different communication network configurations with reference to the drawings in which.

DETAILED DESCRIPTION OF PREFERRED EMBODIMENTS

Figure 1:
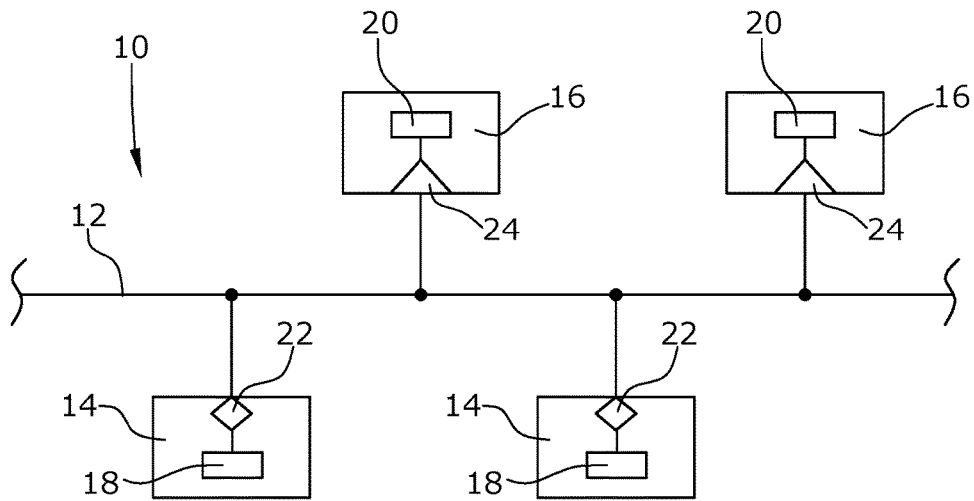
FIGS. 1 to 3 show three different examples of possible applications of CAN-bus participants and CAN-FD participants in a "mixed" communication network.

In FIG. 1 a first exemplary embodiment of a mixed communication network 10 is shown whose bus line 12 has connected thereto first or CAN controllers (bus participants) 14 and second or CAN-FD controllers (or bus participants) 16. As main control components or data processing units of the bus participants FIG. 1 shows at 18 and 20 the microcontrollers of the first and second controllers 14, 16, respectively, which control the units connected to the respective bus participant, such as actuators, sensors or the like and/or receive data from these units. The CAN bus participants 14 comprise bus transceivers 22 which, according to the invention, ensure conversion of messages such that a CAN-FD message, when being received, is converted into a CAN message type such that the respective downstream microcontroller 18 which can merely process CAN messages does not "notice" that a CAN-FD message has been received or read. At 24 such bus transceivers are shown which are CAN-FD-compliant and thus can process both CAN-FD messages and CAN messages.

Figure 2:
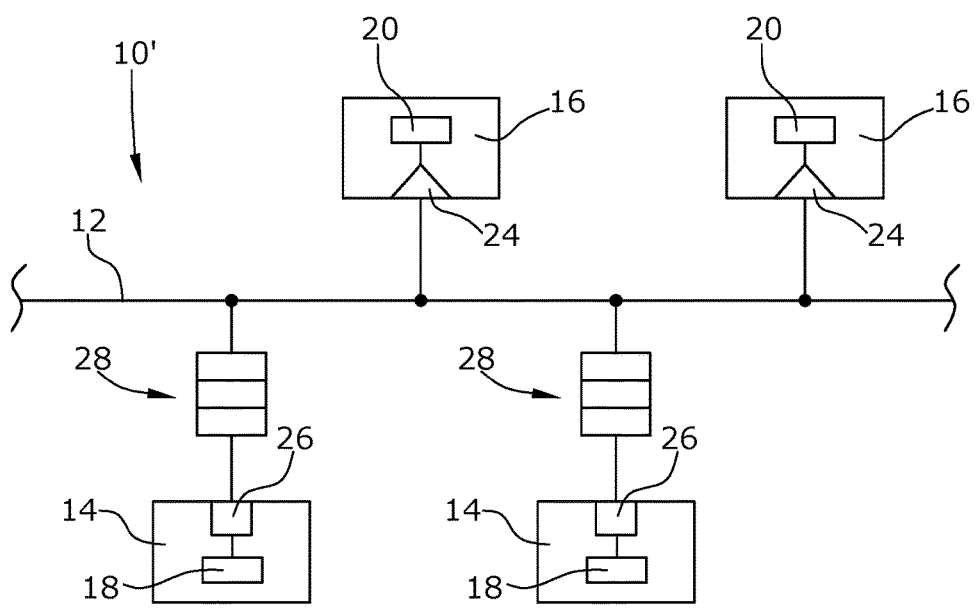

FIG. 2 schematically shows a communication network 10' in which CAN controllers (bus participants) 14 having exclusively CAN-compliant bus transceivers 26 are used besides CAN-FD bus participants 16. In FIG. 2 those components which are identical with or have the same function as components of the communication network 10 of FIG. 1 are identified by the same reference numerals. The CAN bus participants 14 are connected to the bus line 12 with converters 28 being interconnected, while the CAN-FD bus participants 16 are directly connected to the bus line 12. The converters 28 operate in such a way as described above on the basis of the bus transceivers 22. Thus in the converters a conversion of a CAN-FD message into a message of the CAN message type takes place which is then "understood" and forwarded by the exclusively CAN-compliant bus transceiver 26.

Figure 3:
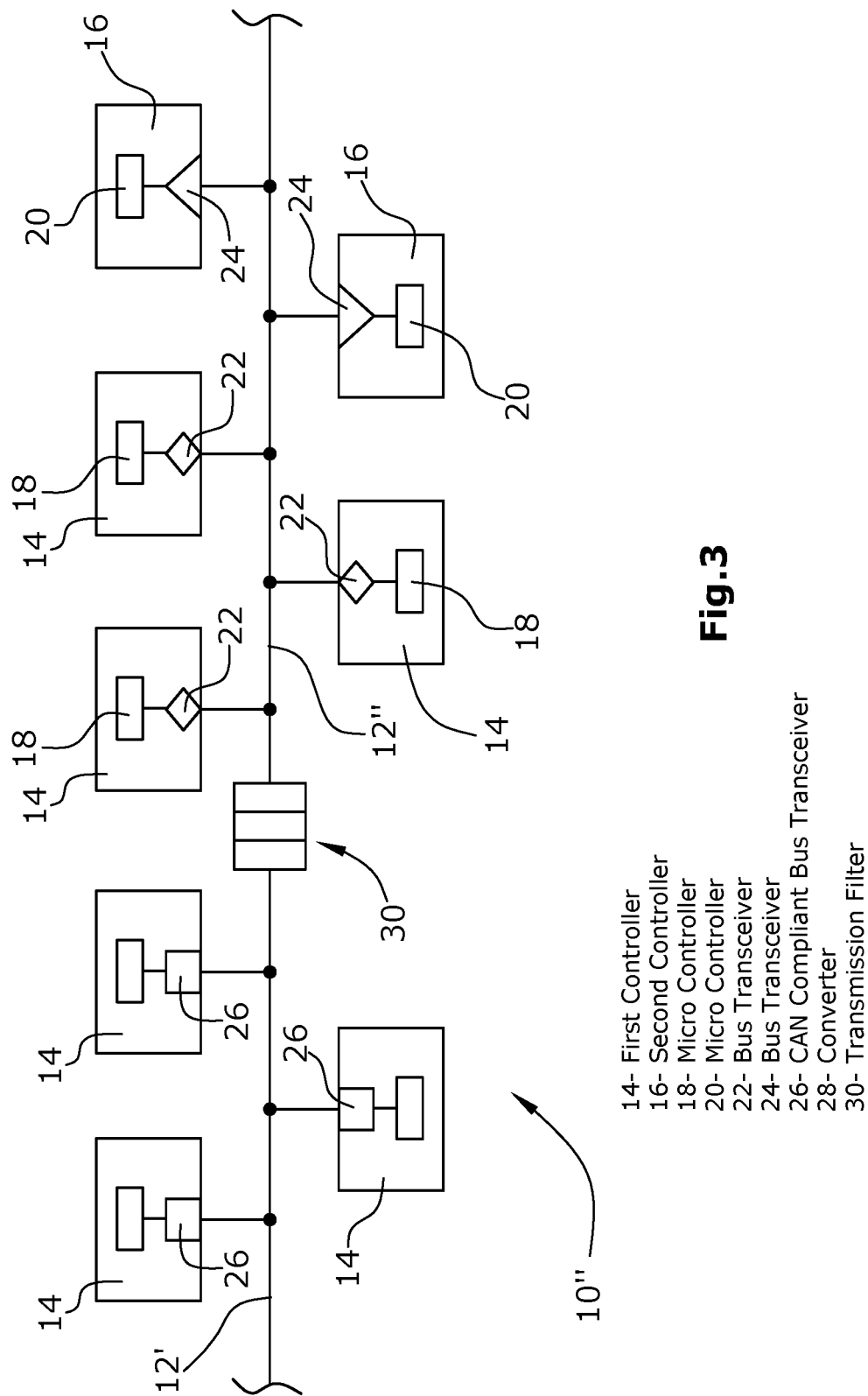

Finally, FIG. 3 shows a communication network 10'' whose bus line is divided into two bus line sections such that the communication network 10' is divided into two portions. The first bus line section 12' is to be of an exclusively CAN-compliant configuration and therefore exclusively CAN-compliant (first) bus participants 14 are connected to this bus line section 12'. These bus participants 14 comprise exclusively CAN-compliant bus transceivers 26. Via a transmission filter 30, which is unidirectional in a way, the first bus line section 12' is connected to a second bus line section 12'' which has connected thereto exclusively bus participants which can process CAN-FD messages. These bus participants need not be exclusively designed for processing CAN-FD messages; as in the example of FIG. 1 described above the bus participants which are connected to the bus line section 12'' can be designed as CAN-FD-compliant bus participants 16 on the one hand and exclusively as CAN-compliant bus participants 14 on the other hand. Thus the CAN-FD bus participants 16 comprise bus transceivers 24 which can process both CAN messages and CAN-FD messages such that the associated microcontrollers 20 can also process both message types (without message conversion).

In contrast, the CAN bus participants 14 are capable of exclusively processing CAN messages as regards their microcontrollers 18. Thus these CAN bus participants 14 are provided with bus transceivers 22 configured according to the invention, as is described above.

The transmission filter 30 operates in a unidirectional manner in that it conveys CAN messages essentially unchanged from the first bus line section 12' to the second bus line section 12''. In contrast, CAN-FD messages from the second bus line section 12'' are prevented from being transmitted unchanged to the first bus line section 12' (unidirectionality). The transmission filter 30 may, for example, be configured such that it converts CAN-FD messages from the second bus line section 12'' into messages of the CAN type in the manner described above which can then be processed by the CAN participants 14 in such a way that these CAN participants 14 do not generate error indications due to an unrecognized message type.

Figure 4:
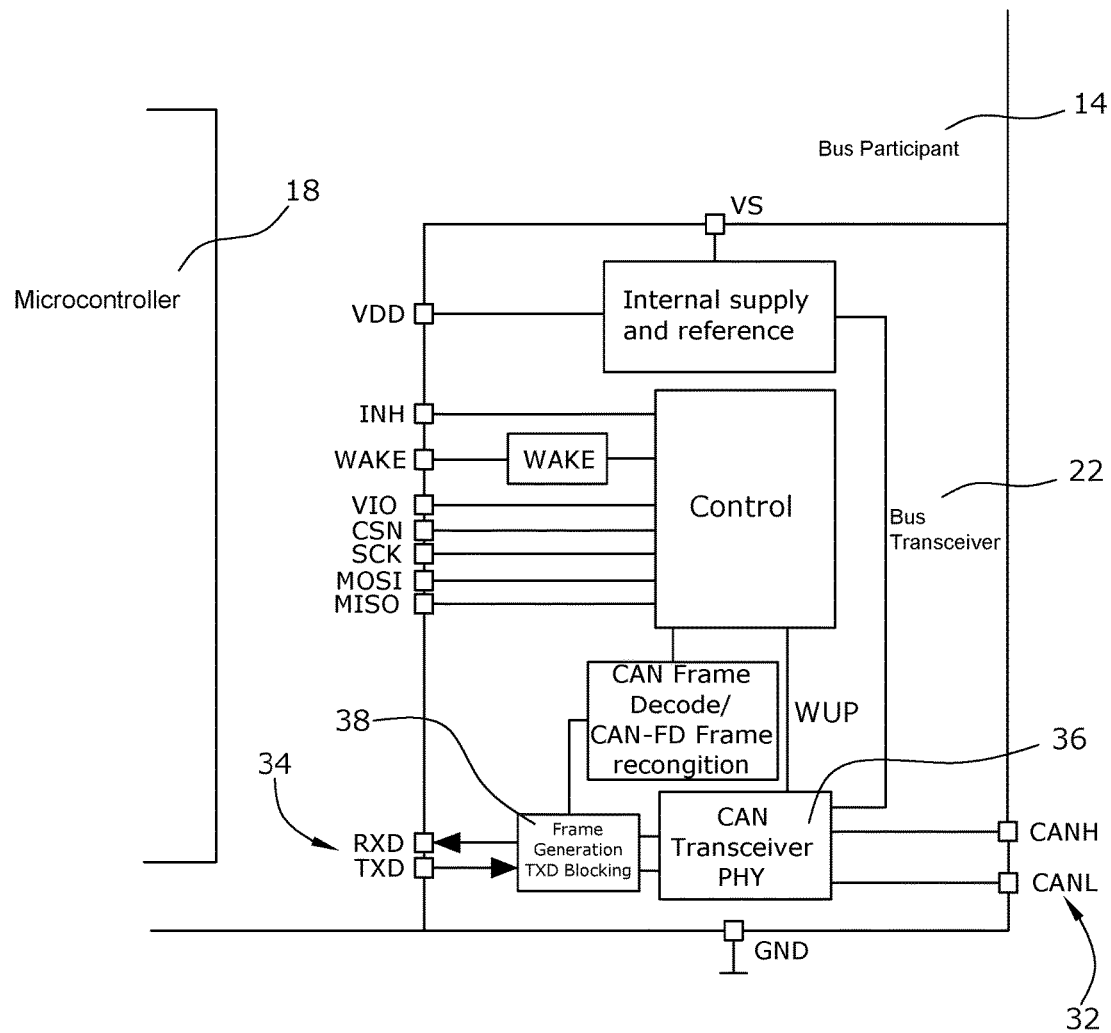
FIG. 4 shows the setup and the interconnection of functional units of a bus transceiver according to the invention for realizing an upward compatibility of previous CAN controllers to make them CAN-FD-compliant such that the CAN controllers do not generate error indications when CAN-FD messages are received.

In FIG. 4 the main components (functional groups) of a bus transceiver 22 according to the invention are shown which may replace the exclusively CAN-compliant bus transceiver of a CAN controller (CAN bus participant) 14 such that this otherwise unchanged bus participant or this controller, when receiving CAN-FD messages, does not generate an error indication due to the fact that these messages are of a different message type. The bus transceiver 22 is connected via its input 32 to the bus (not shown in FIG. 4) and first ensures, as a bus transceiver normally does, a bus level conversion for forwarding the converted bus levels via its output 34 to the microcontroller 18. Between the "physical" CAN transceiver module 36 which is connected to the input 32 of the bus transceiver 22 and the output of the bus transceiver 22 a converter unit 38 is connected according to the invention, which, upon detection of the coding contained in the control data of a CAN-FD message, which indicates that the subsequently sent data are transmitted at an increased data rate, substitutes these data arriving at an increased data rate by substitute or dummy data with a data rate such that the message issued via the output 34 is of the CAN message type and thus typically irrelevant or meaningless, for example. The converter unit 38 further blocks an acknowledgment message which is possibly sent by the microcontroller 18 of the bus participant 14 via TXD such that said message does not reach the bus line 12 where it may cause communication faults since it has been sent at the wrong time. The converter unit 38 only operates in the manner described above when CAN-FD messages are received. When CAN messages are received the converter unit 38 merely forwards the unchanged message to the output 34. The conversion of the messages should take place during the receiving process since otherwise a possibly intolerable delay in the data transmission may occur.

The present invention and the three embodiments according to the invention have been described above on the basis of a communication network which complies with the CAN-FD and/or CAN standard. It is to be understood that the present invention may be applied to all other communication networks where data are transmitted at different rates and where bus participants exist which can process messages with both comparably low and comparably high data rates, and where further such participants exist which cannot process messages with higher transmission rates. Typically, in such communication networks two message types exist which differ from each other, inter alia, with regard to the data rate of at least their payload. Of course, the present invention is also applicable to such communication networks where messages are transmitted at more than two rates. Examples of such standards for message protocols are FlexRay, LIN, CIP, CANopen etc.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A communication network for transmission of messages at different transmission rates, comprising
   a bus line, and
   a plurality of bus participants each of which includes a bus transceiver connected to the bus line and a control unit coupled with said bus transceiver, inter alia, for converting messages received via the bus line and for generating messages to be sent via the bus line,
   wherein each message includes control data and payload,
   wherein the messages include first messages whose payload is transmitted via the bus line at a first rate and second messages whose payload is transmitted via the bus line at a second rate which is higher than the first rate, wherein the first messages are controller area network (CAN) messages and the second messages are CAN with flexible data rate (CAN-FD) messages,
   wherein the control data of each message contain a coding representing the transmission rate of the payload of the respective message,
   wherein the bus participants include first bus participants which can exclusively receive and process a first payload at the first rate and second bus participants which can receive and process both the first and second messages,
   wherein the bus line includes a first and a second bus line section, the first and second bus line sections being distinct from and external to the bus participants,
   wherein the first bus participants are connected to the first bus line section and the second bus participants are connected to the second bus line section,
   wherein first messages are adapted to be transmitted both within the first bus line section and within the second bus line section and second messages are adapted to be transmitted exclusively within the second bus line section, and
   wherein the two bus line sections are coupled with each other by means of a unidirectional transmission filter for allowing for a transmission of first messages from the first bus line section to the second bus line section and for preventing the transmission of second messages from the second bus line section to the first bus line section, the unidirectional transmission filter arranged between the bus transceivers of the bus participants, and
   wherein a substitute payload used by the transmission filter is adapted to be changed by a write data access via the bus line and thus influences or determines the control at least one of the bus transceivers of the first bus participants and the first bus participants connected to the first bus line section, wherein the prevention of the transmission of a second message from the second bus line section to the first bus line section means the prevention of the transmission of a second message to the first bus line section at the second rate or comprises such a type of prevention, wherein the unidirectional transmission filter, upon detection of a coding indicating the second payload transmission rate when receiving a second message, substitutes the payload of the second data by a substitute payload and transmits this payload at the first rate to the first bus line section.

* * * * *